(12) United States Patent
Sala et al.

(10) Patent No.: US 9,511,683 B2
(45) Date of Patent: Dec. 6, 2016

(54) OCCUPANT RECOGNITION AND VERIFICATION SYSTEM

(75) Inventors: Dorel M. Sala, Troy, MI (US);
Jenne-Tai Wang, Rochester, MI (US);
Mark O. Neal, Rochester, MI (US);
Steven C. Tengler, Grosse Pointe Park, MI (US); Steven Swanson, Commerce Township, MI (US)

(73) Assignees: GM Global Technology Operations LLC, Detroit, MI (US); General Motors LLC, Detroit, MI (US)

( * ) Notice: Subject to any disclaimer, the term of this patent is extended or adjusted under 35 U.S.C. 154(b) by 1557 days.

(21) Appl. No.: 12/868,565

(22) Filed: Aug. 25, 2010

(65) Prior Publication Data
US 2012/0053793 A1 Mar. 1, 2012

(51) Int. Cl.
*G06F 17/00* (2006.01)
*B60N 2/00* (2006.01)
*B60N 2/02* (2006.01)

(52) U.S. Cl.
CPC ............. *B60N 2/002* (2013.01); *B60N 2/0244* (2013.01)

(58) Field of Classification Search
USPC ........ 701/45, 49, 53, 89; 359/533, 548–549, 359/841–844, 872–877
See application file for complete search history.

(56) References Cited

U.S. PATENT DOCUMENTS

| 5,528,698 | A | * | 6/1996 | Kamei | B60N 2/002 250/227.15 |
| 5,739,746 | A | * | 4/1998 | Shaffer | B60N 2/002 340/425.5 |
| 5,890,085 | A | * | 3/1999 | Corrado | B60N 2/002 180/271 |
| 6,026,340 | A | * | 2/2000 | Corrado | B60N 2/002 280/735 |
| 7,779,956 | B2 | * | 8/2010 | Breed | B60J 10/00 177/136 |
| 2002/0069004 | A1 | * | 6/2002 | Marchthaler | B60R 16/037 701/49 |
| 2002/0188392 | A1 | * | 12/2002 | Breed | B60C 11/24 701/45 |
| 2003/0009270 | A1 | * | 1/2003 | Breed | B60C 11/24 701/32.4 |

(Continued)

OTHER PUBLICATIONS

Schneider, et al., An Approach to Automotive ECG Measurement Validation Using a Car-Integrated Test Framework, Jun. 3-7, 2012, 2012 Intelligent Vehicles Symposium, pp. 950-953.*

*Primary Examiner* — Atul Trivedi
(74) *Attorney, Agent, or Firm* — John A. Miller; Miller IP Group, PLC

(57) ABSTRACT

A method and system for recognizing and verifying the identity of a driver and front seat passenger of a vehicle. A vehicle owner uploads profile data for several individuals who may be a driver or passenger to a database in the vehicle. When a driver or passenger enters the vehicle, the system uses the profile data—which can include height, weight, and gender information about the individual—along with vehicle data such as seat position, to identify the driver or passenger from the database. The profile data for the known individual is then used to adjust the position of the seat and other components in the cockpit. The profile data is also used by various safety and convenience systems onboard the vehicle.

19 Claims, 4 Drawing Sheets

(56) References Cited

U.S. PATENT DOCUMENTS

| | | | |
|---|---|---|---|
| 2003/0204290 A1* | 10/2003 | Sadler | B60R 25/04 701/1 |
| 2003/0209893 A1* | 11/2003 | Breed | B60J 10/00 280/735 |
| 2004/0010328 A1* | 1/2004 | Carson | G06Q 10/00 700/90 |
| 2004/0122574 A1* | 6/2004 | Inman | B60N 2/0248 701/49 |
| 2008/0021616 A1* | 1/2008 | Aoki | G06K 9/00201 701/45 |
| 2008/0046200 A1* | 2/2008 | Breed | B60N 2/002 702/41 |
| 2008/0148374 A1* | 6/2008 | Spaur | B60R 25/04 726/6 |
| 2008/0228358 A1 | 9/2008 | Wang et al. | |
| 2010/0222969 A1* | 9/2010 | Yamaguchi | B60N 2/002 701/49 |
| 2012/0053793 A1* | 3/2012 | Sala | B60N 2/0244 701/45 |

* cited by examiner

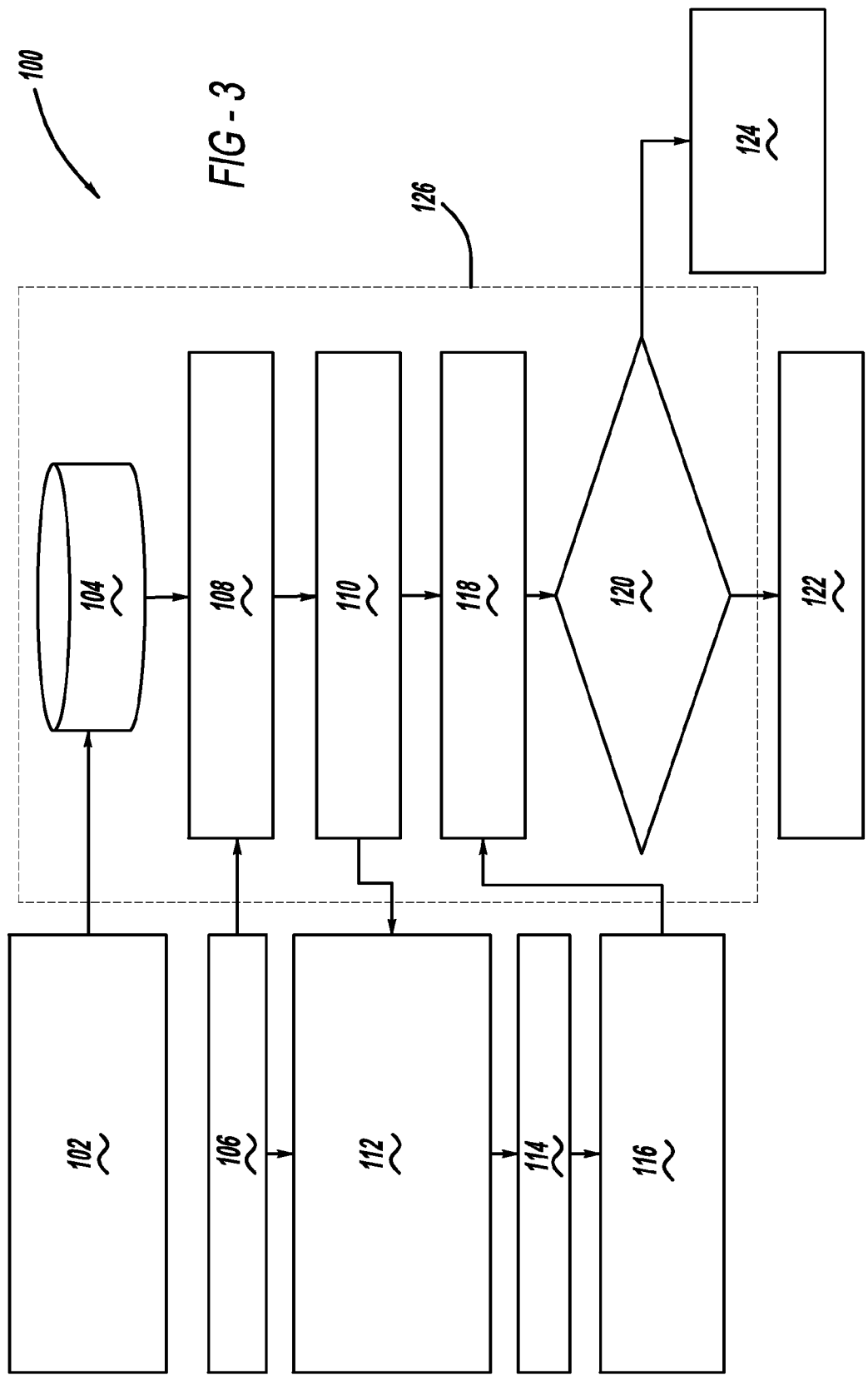

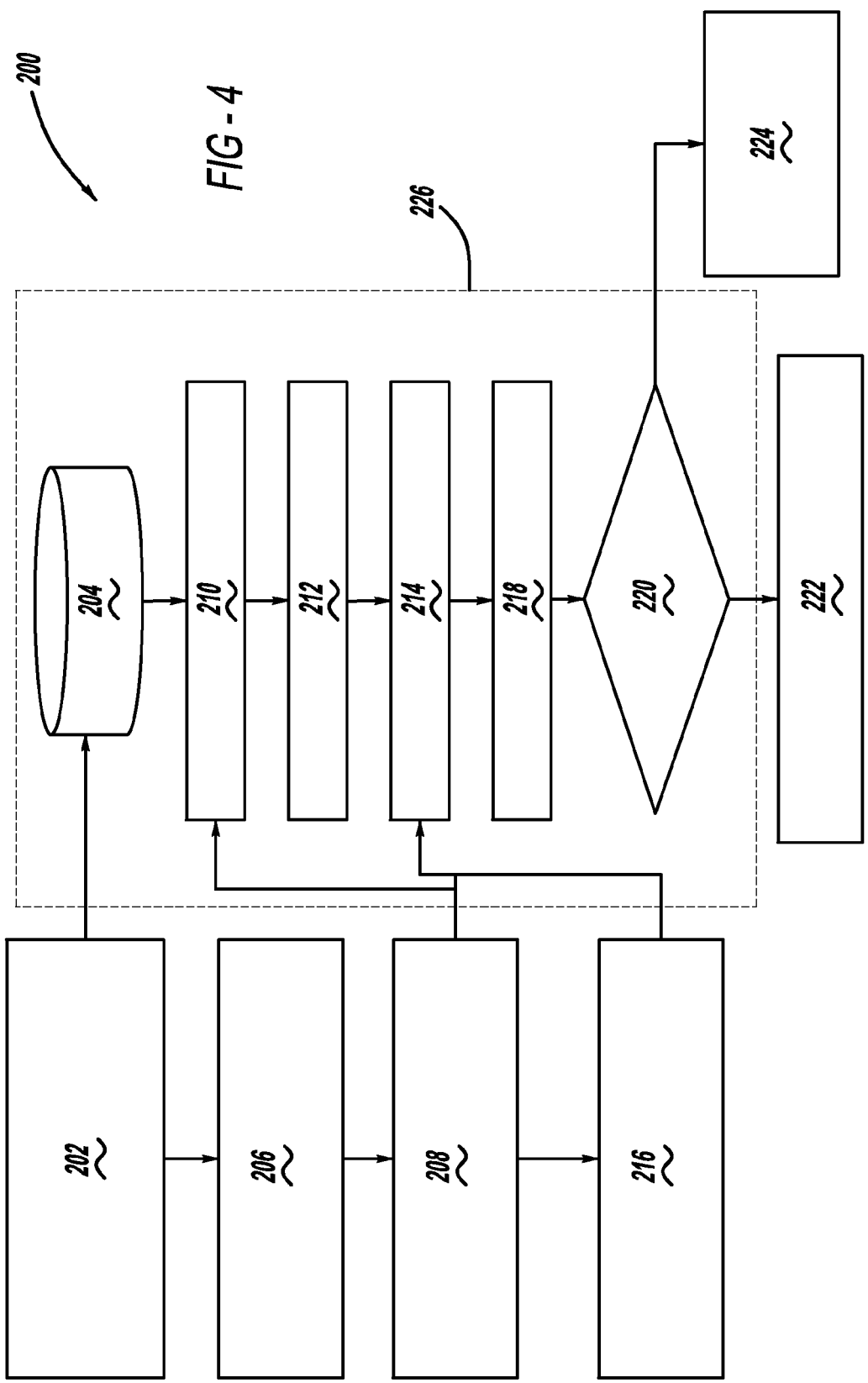

OCCUPANT RECOGNITION AND VERIFICATION SYSTEM

BACKGROUND OF THE INVENTION

1. Field of the Invention

This invention relates generally to a vehicle occupant recognition and verification system and, more particularly, to a method and system for recognizing and verifying the identity of a driver and front seat passenger of a vehicle, which gathers height, weight, and gender information about the driver and passenger, uses the information along with vehicle data such as seat position to identify the driver and passenger from a database of known individuals, and provides detailed data about the driver and passenger to various safety and convenience systems onboard the vehicle.

2. Discussion of the Related Art

Many modern vehicles include systems for automatically positioning a driver seat and mirrors to a configuration which has been previously defined and stored for a particular driver. These systems can faithfully restore the driver seat and mirrors to a combination of locations and orientations which were previously set and stored by a driver. Some such systems can adjust the driver seat and mirrors to the preferred settings of a driver before the driver even enters the vehicle, by using a remote keyless entry key fob or other identifier to trigger the pre-adjustment. Other systems can configure radio, climate control, and other sub-systems to a driver's preferred settings, in addition to the seat and mirrors.

The systems described above all share a fundamental limitation—that is, they can only restore cockpit configuration to settings previously defined and stored for individual drivers. And systems known in the art cannot verify that the person sitting in the driver seat is actually the driver indicated by a remote keyless entry key fob activation or a button push. Existing systems also cannot anticipate optimum settings for safety systems based upon information about the size of the driver. Nor can existing systems automatically provide detailed data about the driver and passenger in the event of an accident.

There is an opportunity to store detailed profile data about individuals who may be a driver or front seat passenger of a vehicle, and use the data to verify the identity of the driver and front seat passenger each time the vehicle is driven. The profile data can be used to adjust the cockpit for optimal comfort and convenience, used to configure safety systems for maximum benefit, and communicated to rescue personnel in the event of a vehicle accident or emergency. The method is also applicable to rear seat passengers. A vehicle which includes these features would offer significant benefits to the consumer, while enhancing the market appeal of the vehicle for the manufacturer.

SUMMARY OF THE INVENTION

In accordance with the teachings of the present invention, a method and system are disclosed for recognizing and verifying the identity of a driver and front seat passenger of a vehicle. A vehicle owner uploads profile data for several individuals who may be a driver or passenger to a database in the vehicle. When a driver or passenger enters the vehicle, the system uses the profile data—which can include height, weight, and gender information about each individual—along with vehicle data such as seat position, to identify the driver or passenger from the database. The profile data for the known individual is then used to adjust the position of the seat and other components in the cockpit. The profile data is also used by various safety and convenience systems onboard the vehicle.

Additional features of the present invention will become apparent from the following description and appended claims, taken in conjunction with the accompanying drawings.

BRIEF DESCRIPTION OF THE DRAWINGS

FIG. 3 is a flow chart diagram of a process used by the occupant recognition and verification system of FIG. 2 to recognize and verify the identity of a driver; and FIG. 4 is a flow chart diagram of a process used by the occupant recognition and verification system of FIG. 2 to recognize and verify the identity of a front seat passenger.

DETAILED DESCRIPTION OF THE EMBODIMENTS

The following discussion of the embodiments of the invention directed to an occupant recognition and verification system is merely exemplary in nature, and is in no way intended to limit the invention or its applications or uses.

Figure 1:
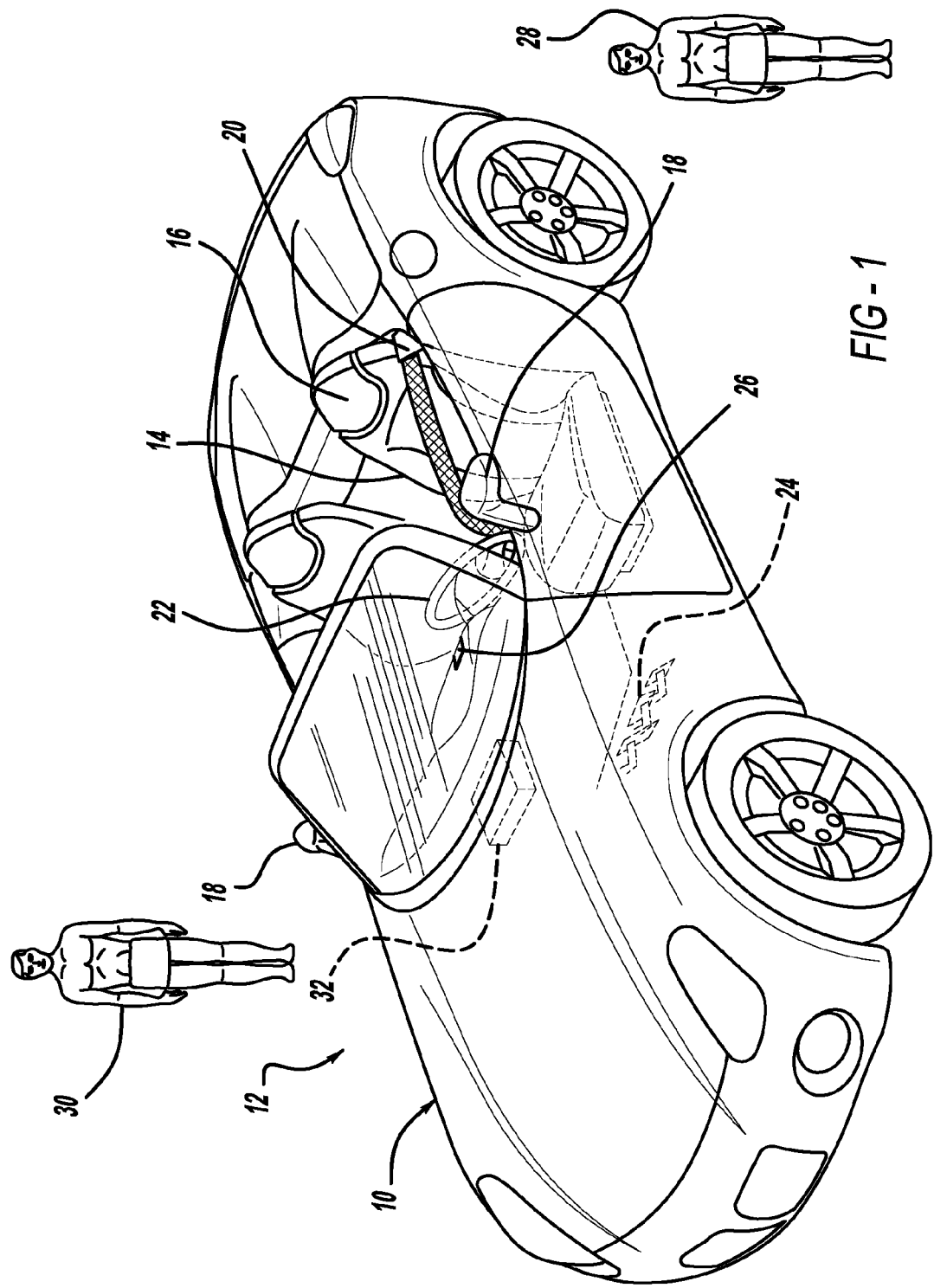
FIG. 1 is an illustration of a vehicle with adjustable cockpit components and an occupant recognition and verification system.

FIG. 1 is an illustration of a vehicle 10 with adjustable cockpit components and, generally, an occupant recognition and verification system 12. The vehicle 10 includes a number of self-adjusting components for driver convenience, including a driver seat 14, a driver headrest 16, outside rearview mirrors 18, a driver shoulder belt height adjuster 20, a steering wheel and column 22, and accelerator and brake pedals 24. A controller 26 is used to verify the identity of a driver 28 and a front seat passenger 30, by any of several possible means discussed below, and share detailed profile data about the driver 28 and the passenger 30 with other systems in the vehicle 10. A wireless module 32 communicates wirelessly with a telematics service, such as GM's OnStar™, to receive data such as driver profile information, and to automatically provide status information to the telematics service in the event of a vehicle malfunction or crash. The wireless module 32 also communicates with the controller 26 and other sub-systems in the vehicle 10, to share data received from the telematics service, and to collect data to be sent to the telematics service.

For illustration purposes, the controller 26 is shown as a separate unit. However, in actual implementation, the functions of the controller 26 could be embodied in the wireless module 32, or a sub-system controller associated with the driver seat 14, or any of a number of other control modules onboard the vehicle 10, as will be discussed below. The occupant recognition and verification system 12, as an integration of specialized software algorithms and various controllers, is intended to provide the driver 28 and the front seat passenger 30 with comfort, convenience, and safety features tailored to their individual characteristics, with little or no effort required on the part of the driver 28 or the passenger 30.

Figure 2:
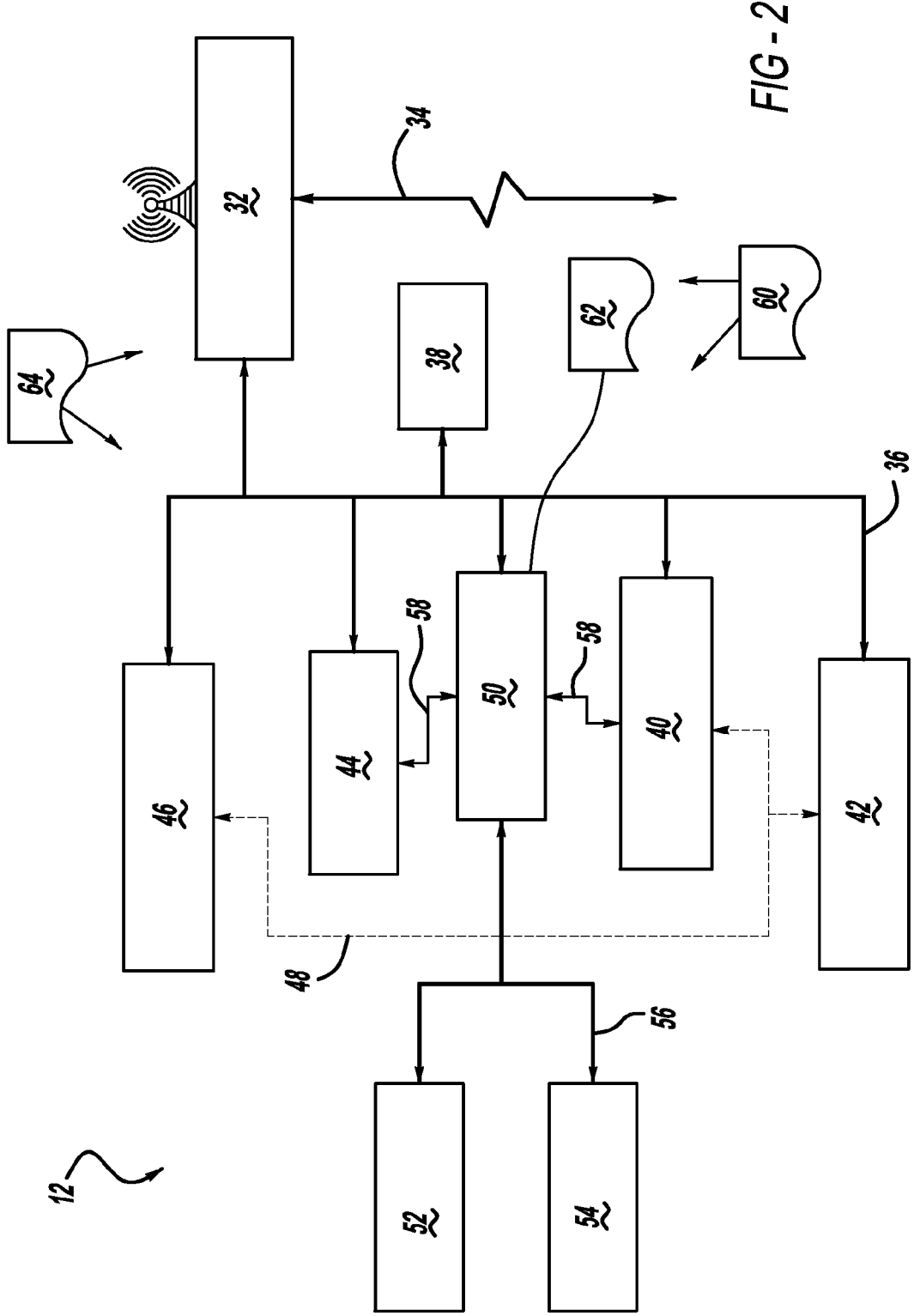
FIG. 2 is a block diagram of the occupant recognition and verification system implemented in various control modules of the vehicle.

FIG. 2 is a block diagram of the occupant recognition and verification system 12 as implemented in various sub-system and component control modules and software algorithms. The wireless module 32 communicates with the telematics service, providing features usually associated with such telematics services, such as on-demand navigation. The wireless module 32 communicates with the vehicle's engine, transmission, and other systems via a high-speed network 34, which may be implemented using high-speed Controller Area Network (hsCAN) or another protocol. The wireless module 32 also communicates with a number of sub-system control modules via a serial bus 36. The serial bus 36 may be implemented using single-wire Controller Area Network (swCAN) or another protocol.

In addition to typical telematics-related wireless communication functions, the wireless module 32 can also receive occupant profile data from the telematics service. The occupant profile data can be provided for any number of individuals expected to be either the driver 28 or the front seat passenger 30 of the vehicle 10. The owner of the vehicle 10 would upload the profile data to the telematics service, via a web-based computer interface for example. Then the owner of the vehicle 10 would download the profile data from the telematics service to the vehicle 10 via the wireless module 32. The profile data could include height, sitting height, weight, gender, and other information about each potential occupant.

A body controller 38 performs various body system control functions. One function of the body controller 38 is to receive a signal from a numbered remote keyless entry key fob device (not shown) operated by the driver 28. If the driver 28 is preliminarily identified via the use of a particular remote keyless entry key fob device, driver identification will need to be verified at a later step, as sharing of keys and key fobs is a common practice, thus raising the possibility that the driver 28 who is about the enter the vehicle 10 is not the person who is associated with the particular key fob. This verification will be discussed below.

A driver seat module 40 handles control functions for the driver seat 14, while a driver door module 42 handles driver door control functions. A passenger seat module 44 handles control functions for the passenger seat, while a passenger door module 46 handles passenger door control functions. The driver seat module 40 may control the operation of a memory seat and mirror feature, therefore the driver seat module 40 is in communication with the driver door module 42 and the passenger door module 46 via a seat/mirror connection 48. The seat/mirror connection 48 may be a simple dedicated or multiplexed wiring connection.

A safety system controller 50 controls the operation of onboard safety systems, such as airbags and seat belt pretensioners. Therefore, the safety system controller 50 communicates with an airbag module 52 and a seat belt module 54, via a safety systems bus 56. The safety system controller 50 also communicates with the driver seat module 40 and the passenger seat module 44, as front seats often contain airbags or seat belt latch status indicators, or other items requiring communication with the safety system controller 50. The safety system controller 50 communicates with the driver seat module 40 and the passenger seat module 44 via a safety/seat connection 58.

The body controller 38, or the safety system controller 50, could be the same unit as the controller 26 described generally and shown in FIG. 1.

Three different software algorithms are included in the occupant recognition and verification system 12 as shown in FIG. 2. An identification and adjustment algorithm 60 performs the functions of driver and passenger identification and verification, and adjustment of the cockpit components for optimum comfort. A safety system configuration algorithm 62 uses the physical attributes of the driver 28 and the front seat passenger 30 to configure the airbag modules 52 and the seat belt modules 54 for optimum safety. For example, airbag deployment intensity can be tailored by the safety system configuration algorithm 62, based on the size, age, gender, and seating position of the occupants.

In the event of a vehicle crash, a post-crash communication algorithm 64 communicates status information to the telematics service via the wireless module 32, so that the telematics service can relay the status information to emergency rescue personnel. Status information provided by the post-crash communication algorithm 64 includes vehicle status information, such as crash severity, rollover status, and airbag deployment status, as well as profile information about the occupants, such as age, gender, and stature. The status information from the post-crash communication algorithm 64 could also include medical history data about the driver 28 and/or the front-seat passenger 30, if that data was included in their profiles. The status information from the post-crash communication algorithm 64 could even include possible injury information, based on both the occupants' profile data and the data about the severity of the crash.

In a first embodiment of the occupant recognition and verification system 12, the identification and adjustment algorithm 60 resides in the wireless module 32. The identification and adjustment algorithm 60 uses remote keyless entry key fob information, along with seat position, occupant weight, and other data, to attempt to verify the identity of the driver 28 and/or the front seat passenger 30. If identity is verified, then the identification and adjustment algorithm 60 commands the adjustment of components, such as the driver seat 14, the headrest 16, the outside rearview mirrors 18, the shoulder belt height adjuster 20, the steering wheel and column 22, and the pedals 24, to optimum position.

In the first embodiment, the wireless module 32 receives data, such as remote keyless entry key fob data from the body controller 38 and seat position data from the driver seat module 40, via the serial bus 36. After receiving input data via the serial bus 36 and wirelessly from the telematics service, the wireless module 32 performs occupant identification and verification calculations using the identification and adjustment algorithm 60, described in detail below. The wireless module 32 then sends data via the serial bus 36, such as profile data for an identified occupant to the safety system controller 50.

The safety system configuration algorithm 62 resides in the safety system controller 50, and the post-crash communication algorithm 64 resides in the wireless module 32, in all preferred embodiments. However, the software of the algorithms 60, 62, and 64 could reside in any control module in the vehicle 10 which possesses sufficient computing capacity and is connected via the necessary input and output channels.

A second embodiment of the occupant recognition and verification system 12 can be realized by moving the identification and adjustment algorithm 60 from the wireless module 32 to the driver seat module 40 and the passenger seat module 44. In this second embodiment, as in the first, the wireless module 32 serves to download occupant profile data from the telematics service to the vehicle 10, and also communicates status information for the telematics service to relay to emergency personnel in the event of an accident. But in the second embodiment, the wireless module 32 does not host the identification and adjustment algorithm 60. Instead, the identification and adjustment algorithm 60 can be distributed between the driver seat module 40 and the passenger seat module 44. For example, the driver identification function could reside in the driver seat module 40, and the passenger identification function could reside in the passenger seat module 44. Seat system control modules, such as the modules 40 and 44, typically possess sufficient computing capacity to handle the occupant identification functions contained in the identification and adjustment algorithm 60.

In the second embodiment, the functions of the body controller 38, the driver door module 42, the passenger door module 46, the safety system controller 50, the airbag modules 52, and the seat belt modules 54 remain the same as in the first embodiment. In particular, the safety system configuration algorithm 62 would still reside in the safety system controller 50.

A third embodiment of the occupant recognition and verification system 12 is also possible in which occupant profile data is not downloaded from the telematics service to the vehicle 10 via the wireless module 32. Instead, occupant profile data is communicated directly from the driver 28 and/or the front seat passenger 30 to the vehicle 10. For example, the driver's profile data could be wirelessly transmitted from a smart card or smart phone device (not shown) in the possession of the driver 28. The transmission could be via Bluetooth, or Near Field Communication (NFC), or some other protocol. In the case of Bluetooth communication, the profile data could be received by the body controller 38, while in the case of NFC, an NFC reader/writer could be embedded in the door or some other location in the vehicle 10. Even if the driver 28 and/or the front seat passenger 30 provide profile data directly to the vehicle 10, by way of a smart card or smart phone device or other means, verification of occupant identity will still be performed. For example, if profile data provided by the front seat passenger 30 indicates that the passenger's weight is 200 pounds, but the front seat cushion load sensor detects a weight of only 120 pounds, then a mismatch will be declared, and personalization features will be disabled.

FIG. 3 is a flow chart diagram 100 of a process used by the occupant recognition and verification system 12 to recognize and verify the identity of the driver 28. At box 102, the vehicle owner defines profile data for as many individuals as desired. As described above, the profile data can include age, gender, standing height, sitting height, weight, medical history, and other information about each individual. For individuals expected to be the driver 28 of the vehicle 10, a remote keyless entry key fob number association can also be defined. The profile data can be uploaded to a telematics service, and then downloaded to a driver profile database 104 onboard the vehicle 10. Or the profile data can be loaded onto a smart card or smart phone device, a USB drive, or other apparatus, and transferred to the driver profile database 104.

At box 106, the impending driver 28 activates a numbered remote keyless entry key fob device to unlock the vehicle 10. At box 108, if the key fob number is associated with a particular individual in the driver profile database 104, then a timer is started, and the profile data for the individual who is associated with the numbered key fob is extracted. At box 110, the configuration of the cockpit, including seat and mirror positions and other parameters, are calculated for the individual whose profile data was extracted from the driver profile database 104. The calculations at the box 110 can be performed using an anthropometric estimator module and inverse kinematic calculations—as described in detail in one non-limiting example in application Ser. No. 12/868,388, titled, INDIVIDUALIZABLE CONVENIENCE SYSTEM FOR DRIVERS, filed Aug. 25, 2010, herein incorporated by reference. The calculations at the box 110 require standing height, sitting height, and gender as input, all of which is data that would be available in the driver profile database 104. At box 112, the vehicle 10 self-adjusts the cockpit configuration to the preferred settings for the individual whose profile data is being used, if that individual has saved his or her preferences in the driver profile database 104. If no preferred settings are stored for the individual whose profile data was extracted from the driver profile database 104, then the vehicle can adjust the cockpit configuration to the theoretical settings calculated at the box 110.

At box 114, the driver 28 enters the vehicle. At box 116, the driver 28 re-adjusts the cockpit configuration, or sets or resets the interior memory system. At box 118, at a certain prescribed elapsed time after the timer was started at the box 108, the actual cockpit configuration parameters are determined. For example, the fore-aft position, cushion height, and recline angle of the driver seat 14 can be obtained from the driver seat module 40, the angles of the outside rearview mirrors 18 can be obtained from the driver door module 42 and the passenger door module 46, and the tilt angle of the steering wheel and column 22 can be obtained from the body controller 38 or whatever control module on the serial bus 36 contains this data. At decision diamond 120, a driver verification calculation is performed.

The driver verification calculation at the decision diamond 120 comprises a comparison of the actual cockpit configuration parameters with the expected cockpit configuration parameters. A mathematical similarity function is used to determine the correlation between the actual cockpit configuration and the expected cockpit configuration. Generally, the mathematical similarity function is evaluated and compared to a threshold value. Verification may be successful if the difference between the value of the similarity function and the threshold is positive, or if the difference is negative, depending on how the similarity function is defined. An example of this calculation is described below. If driver verification is successful, meaning that the driver 28 is verified as being the individual who is expected based on the numbered remote keyless entry device which was activated at the box 106, then personalization features are enabled at box 122. Otherwise, personalization features are disabled at box 124. Personalization features can include further configuration of the cockpit environment for driver comfort and convenience, and usage of the profile data about the now-known driver 28 in configuration of safety systems via the safety system configuration algorithm 62.

The elements of the flow chart diagram 100 which are shown within dashed box 126 are included in the identification and adjustment algorithm 60.

It is noted that there are other ways that a preliminary identification of the driver 28 may be obtained, besides activation of a numbered remote keyless entry key fob. For example, the driver 28 may press an interior memory recall button, or select a name from a displayed list, or enter a pass code, to preliminarily identify himself or herself. In any case, the comparison of the actual cockpit configuration to the expected cockpit configuration can still be used as a verification step. Likewise, there are other cues that can be used to verify the identity of the driver 28, aside from seat, mirror, and steering wheel positions. For example, a microphone could pick up voice data from the driver 28, and a voice pattern analysis could be performed to estimate the age and the gender of the driver 28. As another example, biometric data, such as fingerprints or facial feature data, could be used for driver identification and verification.

FIG. 4 is a flow chart diagram 200 of a process used by the occupant recognition and verification system 12 to recognize and verify the identity of the front seat passenger 30. At box 202, the vehicle owner defines profile data for as many individuals as desired. The content of the profile data, and the methods of loading the profile data to the vehicle 10, were described above for the box 102 of the flow chart diagram 100. The profile data for the potential front seat passengers 30 is loaded into a passenger profile database 204, which may be integrated with or separate from the driver profile database 104.

At box 206, the passenger 30 enters the front seat of the vehicle 10. At box 208, a seat cushion load sensor measures the seated weight of the passenger 30. Many vehicles now include front seat passenger load sensors for airbag suppression systems. The seat cushion load data would be provided by the passenger seat module 44 on the serial bus 36, and picked up by the wireless module 32 or whatever control module is hosting the identification and adjustment algorithm 60. At box 210, the presence of the passenger 30 is detected in the identification and adjustment algorithm 60. At box 212, a timer is started upon detection of the passenger 30.

At box 214, configuration parameters are monitored for the front seat passenger's interior space. This begins with the seat cushion load measurement from the box 208, and can also include seat positions, temperature settings, voice data, and any other data which could be used to identify the front seat passenger 30. At box 216, the passenger 30 adjusts the interior to suit his or her personal comfort. At box 218, at a certain prescribed elapsed time after the timer was started at the box 212, the actual front seat passenger configuration parameters are evaluated. At decision diamond 220, a passenger identification calculation is performed.

The passenger identification calculation at the decision diamond 220 comprises an evaluation of the actual passenger signature—weight, voice data, etc.—to see if an individual can be identified from the passenger profile database 204. A mathematical similarity function can be evaluated for the passenger 30 and compared to a signature value for each individual person in the passenger profile database 204. If the correlation between the actual passenger signature and the signature of any individual person from the passenger profile database 204 is within a certain tolerance value, then the passenger 30 is identified as being that individual. An example of this calculation is described below. If passenger identification is successful, then personalization features are enabled at box 222. Otherwise, personalization features are disabled at box 224. Personalization features can include further configuration of the cockpit environment for passenger comfort and convenience, and usage of the profile data about the now-known passenger 30 in configuration of safety systems via the safety system configuration algorithm 62.

While there are fewer cockpit configuration parameters to be adjusted for the front seat passenger 30 than for the driver 28, it is still considered worthwhile to tailor the passenger environment as much as possible to the individual who occupies the front passenger seat. Front seat passenger configuration items include seat fore-aft position, height, recline angle, and lumbar settings, seat and air temperature settings, and others. Furthermore, the methods described above are also applicable to rear seat passengers, as some vehicles now offer seating and environmental controls which are configurable for second and third row passengers.

The elements of the flow chart diagram 200 which are shown within dashed box 226 are included in the identification and adjustment algorithm 60.

Examples of the functions used for verification of the driver 28 and identification of the passenger 30 are described below. For the driver 28, the following is an example of a function that can be evaluated at the decision diamond 120:

$$f(x_1, x_2, x_3) = w_1 e^{-\frac{(x_1-\bar{x}_1)^2}{\sigma_1^2}} + w_2 e^{-\frac{(x_2-\bar{x}_2)^2}{\sigma_2^2}} + w_3 e^{-\frac{(x_3-\bar{x}_3)^2}{\sigma_3^2}} \quad (1)$$

Where $x_1$ is the current seat fore aft position value, $x_2$ is the current steering wheel tilt value and $x_3$ is the current front cushion height value; $\bar{x}_1$, $\bar{x}_2$, and $\bar{x}_3$ are the predetermined expected values of the seat fore aft, steering wheel tilt and front cushion height, respectively; $w_1$, $w_2$, and $w_3$ are predetermined weighting factors for each of the three features; $\sigma_1$, $\sigma_2$, and $\sigma_3$ are predetermined feature value spreads per driver. The values for the weighting factors $w_1$, $w_2$, and $w_3$ are chosen such that the features with higher variation among the drivers and lower variation per driver get a higher weight value. In other words, the weighting factors are higher for features which have higher discriminating power between individuals.

If $f(x_1, x_2, x_3) \geq q$, where q is a predetermined threshold value, the driver 28 is recognized as the expected person from the driver profile database 104 and the remote keyless entry key fob activation at the box 106. Otherwise, personalization features are disabled, as discussed previously.

Similarly, for the front seat passenger 30, the following function can be evaluated at the decision diamond 220:

$$g(y) = e^{-\frac{(y-\bar{y})^2}{\sigma_y^2}} \quad (2)$$

Where y is the current passenger weight or mass value as determined by the passenger presence system, $\bar{y}$ is the predetermined expected value for the weight or mass, and $\sigma_y$ is the predetermined spread of the passenger weight or mass.

If $g(y) \geq t$, where t is a predetermined threshold value, the passenger 30 is recognized as a known person from the passenger profile database 204. Otherwise, personalization features are disabled, as discussed previously.

In both the driver and front seat passenger cases, other parameters and functions can be evaluated, besides the ones listed in the examples above. In general, evaluating a greater number of parameters allows a greater certainty to be obtained in the identification and verification of the individual.

Using the methods and calculations described above, the occupant recognition and verification system 12 can automatically identify the individuals who drive or ride in the vehicle 10, and optimally configure the cockpit environment for each individual. These features provide a level of comfort, convenience, and safety which is not available in traditional memory-seat systems.

The foregoing discussion discloses and describes merely exemplary embodiments of the present invention. One skilled in the art will readily recognize from such discussion and from the accompanying drawings and claims that various changes, modifications and variations can be made therein without departing from the spirit and scope of the invention as defined in the following claims.

What is claimed is:

1. A method for recognizing and verifying an identity of one or more occupants of a vehicle, said method comprising:

providing profile data for a plurality of individuals;
loading the profile data for the plurality of individuals into a database onboard the vehicle, including wirelessly downloading the profile data from a telematics service to which the profile data had previously been uploaded;
entering the vehicle by the one or more occupants of the vehicle;
recognizing an identity of the one or more occupants of the vehicle;
starting a timer and retrieving the profile data from the database for the one or more occupants of the vehicle who were recognized;
calculating theoretical cockpit configuration parameters based on the profile data for each of the recognized occupants;
adjusting cockpit configuration by each of the recognized occupants;
determining actual cockpit configuration parameters after a certain time has elapsed since the timer was started for each of the recognized occupants;
comparing the actual cockpit configuration parameters with expected cockpit configuration parameters for each of the recognized occupants using a mathematical similarity function; and
verifying the identity of each of the recognized occupants by computing the difference between the value of the mathematical similarity function and a predefined threshold, and enabling personalization features if the value of the difference meets a predefined criteria.

2. The method of claim 1 wherein providing profile data for a plurality of individuals includes providing attributes about each of the individuals, where the attributes include standing height, sitting height, weight, age, gender, and preferred settings.

3. The method of claim 1 wherein recognizing an identity of the one or more occupants of the vehicle includes one or more of; pushing a memory recall button, selecting a name of a specific individual from a display device, detecting a remote keyless entry device or personal mobile phone associated with a specific individual, measuring occupant height and weight data, and sensing occupant biometric features including fingerprints, voice characteristics, and facial characteristics.

4. The method of claim 1 wherein calculating theoretical cockpit configuration parameters based on the profile data for each of the recognized occupants includes using an anthropometric model and inverse kinematic calculations.

5. The method of claim 1 wherein comparing the actual cockpit configuration parameters with expected cockpit configuration parameters includes using a mathematical similarity function which includes a term for each configuration parameter being compared, and each of the terms is a function of the difference between the configuration parameters being compared.

6. The method of claim 5 wherein each of the terms of the mathematical similarity function includes a weighting factor, where the weighting factors are larger for parameters with higher discriminating power between the individuals.

7. The method of claim 1 wherein enabling personalization features includes adjusting features of the cockpit for optimum comfort and convenience of each of the recognized occupants.

8. The method of claim 1 wherein enabling personalization features includes adjusting safety systems onboard the vehicle for optimum safety of each of the recognized occupants.

9. The method of claim 1 wherein the one or more occupants of the vehicle includes a driver and a front seat passenger.

10. A method for recognizing and verifying an identity of a driver of a vehicle, said method comprising:
providing profile data for a plurality of individuals including the driver of the vehicle;
loading the profile data for the plurality of individuals into a database onboard the vehicle;
activating a remote keyless entry device by the driver to gain entry to the vehicle;
starting a timer and retrieving the profile data from the database for the driver who is associated with the remote keyless entry device which was activated;
calculating theoretical cockpit configuration parameters based on the profile data for the driver using an anthropometric model and inverse kinematic calculations;
automatically pre-adjusting cockpit configuration by the vehicle using a set of expected cockpit configuration parameters;
entering the vehicle and adjusting the cockpit configuration by the driver;
determining actual cockpit configuration parameters after a certain time has elapsed since the timer was started;
comparing the actual cockpit configuration parameters with the expected cockpit configuration parameters using a mathematical similarity function; and
verifying the identity of the driver by computing the difference between the value of the mathematical similarity function and a predefined threshold, and enabling personalization features if the difference is positive, or disabling personalization features if the difference is negative.

11. The method of claim 10 wherein automatically pre-adjusting cockpit configuration by the vehicle using a set of expected cockpit configuration parameters includes defining the expected cockpit configuration parameters based on preferred settings if available for the driver, or defining the expected cockpit configuration parameters based on the theoretical cockpit configuration parameters which were calculated for the driver.

12. The method of claim 10 wherein comparing the actual cockpit configuration parameters with the expected cockpit configuration parameters using a mathematical similarity function includes using a mathematical similarity function which includes a term for each configuration parameter being compared, and each of the terms is a function of the difference between the configuration parameters being compared.

13. The method of claim 10 wherein enabling personalization features includes adjusting the cockpit configuration for optimum comfort and convenience of the driver, and adjusting safety systems onboard the vehicle for optimum safety of the driver.

14. A system for recognizing and verifying an identity of one or more occupants of a vehicle, said system comprising:
a plurality of convenience control modules for controlling positions of cockpit components and sub-systems;
a plurality of safety control modules for controlling configurations of safety systems;
a master safety system controller in communication with the plurality of safety control modules, said master safety system controller configured to adjust settings of the plurality of safety control modules to optimize safety based on the identity of the occupants of the vehicle;

a wireless module in communication with the master safety system controller and the plurality of convenience control modules, said wireless module wirelessly communicating with a telematics service provider; and an identification and adjustment software sub-system responsive to one or more inputs from the plurality of convenience control modules, said identification and adjustment software sub-system being configured with and operating an algorithm that recognizes and verifies the identity of the one or more occupants of the vehicle, calculates theoretical cockpit configuration parameters based on the identity of the one or more occupants using an anthropometric model and inverse kinematic calculations, adjusts the positions of the cockpit components and sub-systems based on the theoretical cockpit configuration parameters to optimize comfort of the occupants, and communicates the identity of the occupants of the vehicle to the master safety system controller.

15. The system of claim 14 wherein the plurality of convenience control modules includes a driver seat module, a driver door module, a passenger seat module, and a passenger door module.

16. The system of claim 15 wherein the identification and adjustment software sub-system resides in the driver seat module and the passenger seat module.

17. The system of claim 14 wherein the plurality of safety control modules includes one or more airbag modules and one or more seat belt modules.

18. The system of claim 14 wherein the identification and adjustment software sub-system resides in the wireless module.

19. The system of claim 14 wherein the one or more inputs include a remote keyless entry device identifier, a seat cushion load value, a fore-aft seat position, a vertical seat position, a seat back recline angle, and voice pattern data.

* * * * *